June 20, 1944. H. C. MATLOCK 2,351,990
CONVEYING APPARATUS
Filed Jan. 3, 1942 3 Sheets-Sheet 2

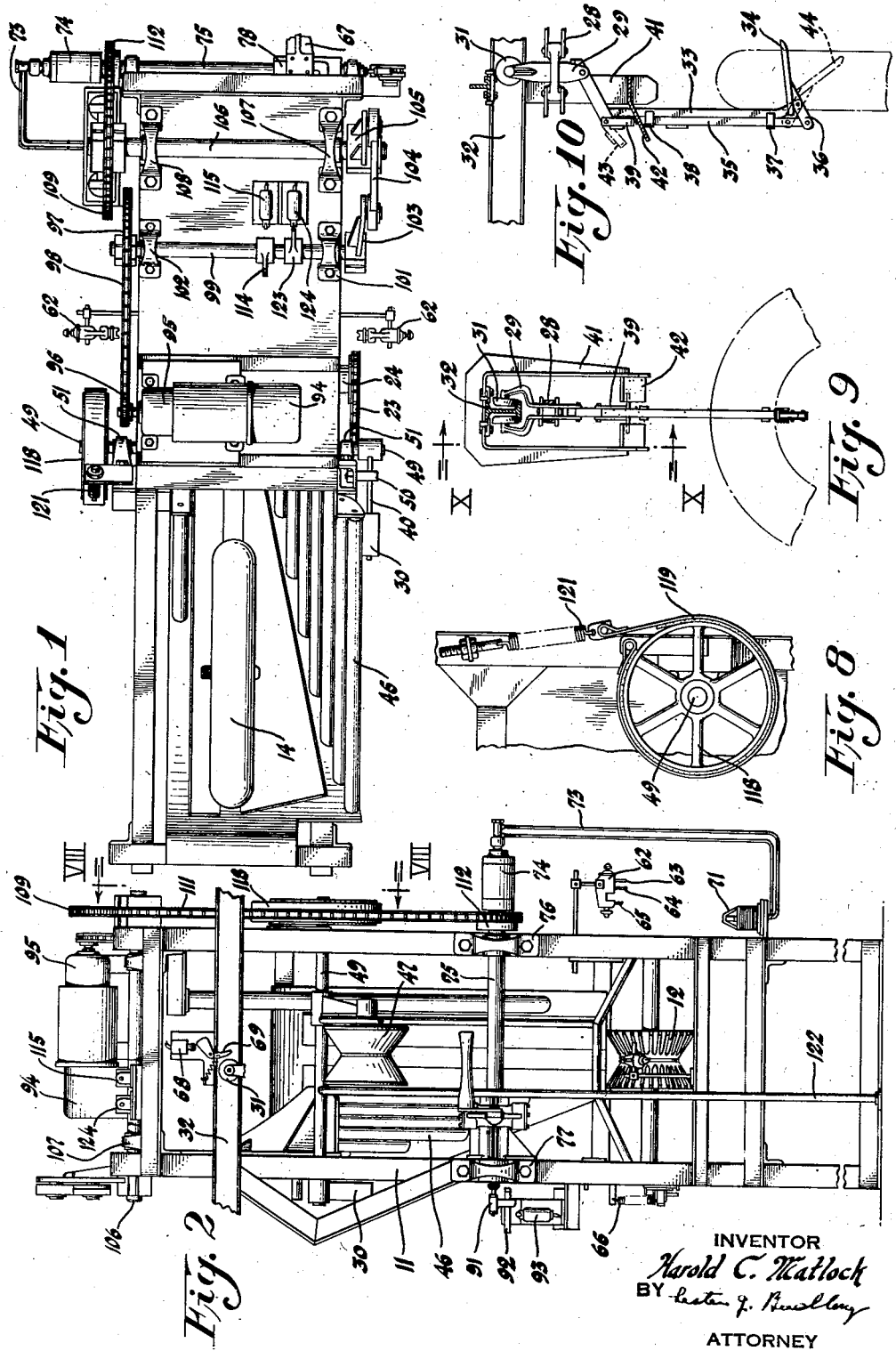

INVENTOR
Harold C. Matlock
BY
ATTORNEY

June 20, 1944.  H. C. MATLOCK  2,351,990
CONVEYING APPARATUS
Filed Jan. 3, 1942   3 Sheets-Sheet 3
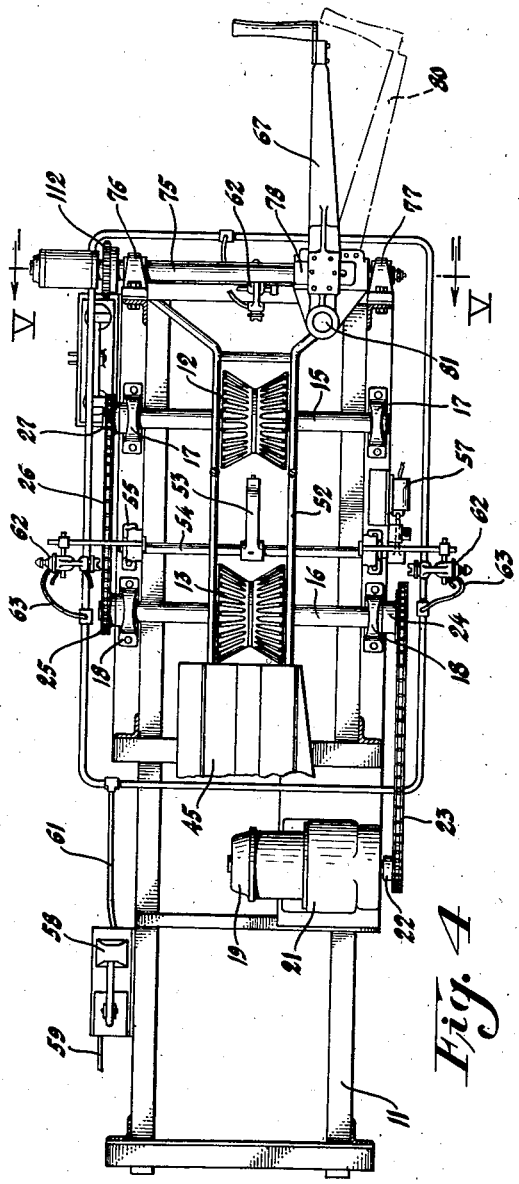
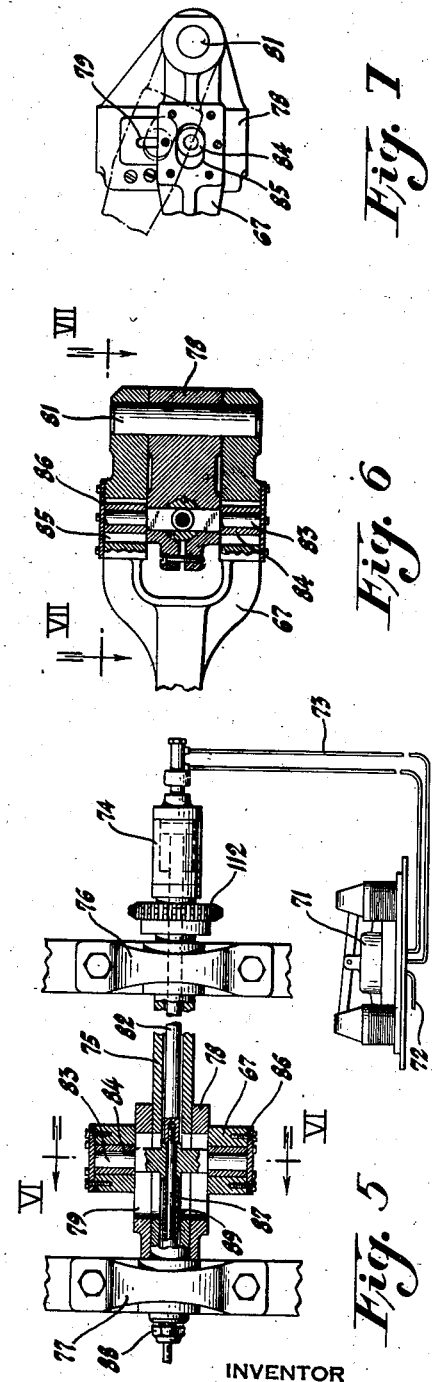
INVENTOR
Harold C. Matlock
BY
ATTORNEY Patented June 20, 1944

2,351,990

UNITED STATES PATENT OFFICE 2,351,990

CONVEYING APPARATUS

Harold C. Matlock, Bridgeport, Conn., assignor to United States Rubber Company, New York, N. Y., a corporation of New Jersey Application January 3, 1942, Serial No. 425,539

3 Claims. (Cl. 198—19)

This invention relates to conveying apparatus and in particular it relates to an apparatus for removing annular articles from a moving conveyor, disposing the article at a treating station where it may be subjected to a manufacturing operation and finally removing the article from the treating station and depositing it upon a moving hook-type conveyor.

In the handling of annular objects such as pneumatic tires, much labor has been saved by the use of conveyors which move the tire from one location to another. When it is necessary to remove the tires from the conveyor for performing a manufacturing operation, it usually requires the services of an operator to remove the tires from a conveyor hook, place the tire in a treating station and thereafter replace the tire on the conveyor hook. This is a tedious operation and in some cases the tires are relatively heavy which makes the task burdensome to the operator.

In accordance with the practice of my invention, I have found that, by a novel mechanical arrangement, tires can be efficiently removed from the conveyor, operated upon at a treating station and replaced on the conveyor entirely automatically. The treating station as described herein is incidental to the manipulation of the tire; for example, at this station the tire may be painted, washed, trimmed, balanced or subjected to other manufacturing operations. In the present invention, I describe an apparatus which includes painting of the tire by a spraying operation. However, it is to be understood that the invention is not to be limited to this particular treatment.

Among the objects of my invention are to provide an apparatus for automatically moving objects to a treating station and subsequently moving the object from the treating station to a conveyor hook; to remove the element of hard labor in lifting tires to and from a treating station; to provide accurate means for depositing tires on a moving conveyor hook; and to provide such an apparatus which operates uniformly and efficiently in removing and replacing tires transversely of a hook-type conveyor. These and other objects and advantages will appear more fully in the following detailed description when considered in connection with the accompanying drawings in which:

Fig. 1 is a plan view of an apparatus embodying my invention;

Fig. 2 is an end view thereof;

Fig. 4 is a plan view, partly in section, of the lower portion of the apparatus taken along line IV—IV of Fig. 3;

Fig. 5 is an end view, partly in section, of a portion of the apparatus taken along line V—V of Fig. 4 illustrating a tire lifting arm mechanism;

Fig. 6 is a view, in section, taken along line VI—VI of Fig. 5 illustrating the two point oscilation of the tire lifting arm;

Fig. 7 is a plan view thereof taken along line VII—VII of Fig. 6;

Fig. 8 is a detail view of a braking device;

Fig. 9 is a front view of a conveyor type tire carrier and tripping device; and, Fig. 10 is a side elevational view thereof taken along line X—X of Fig. 9.

Figure 3:
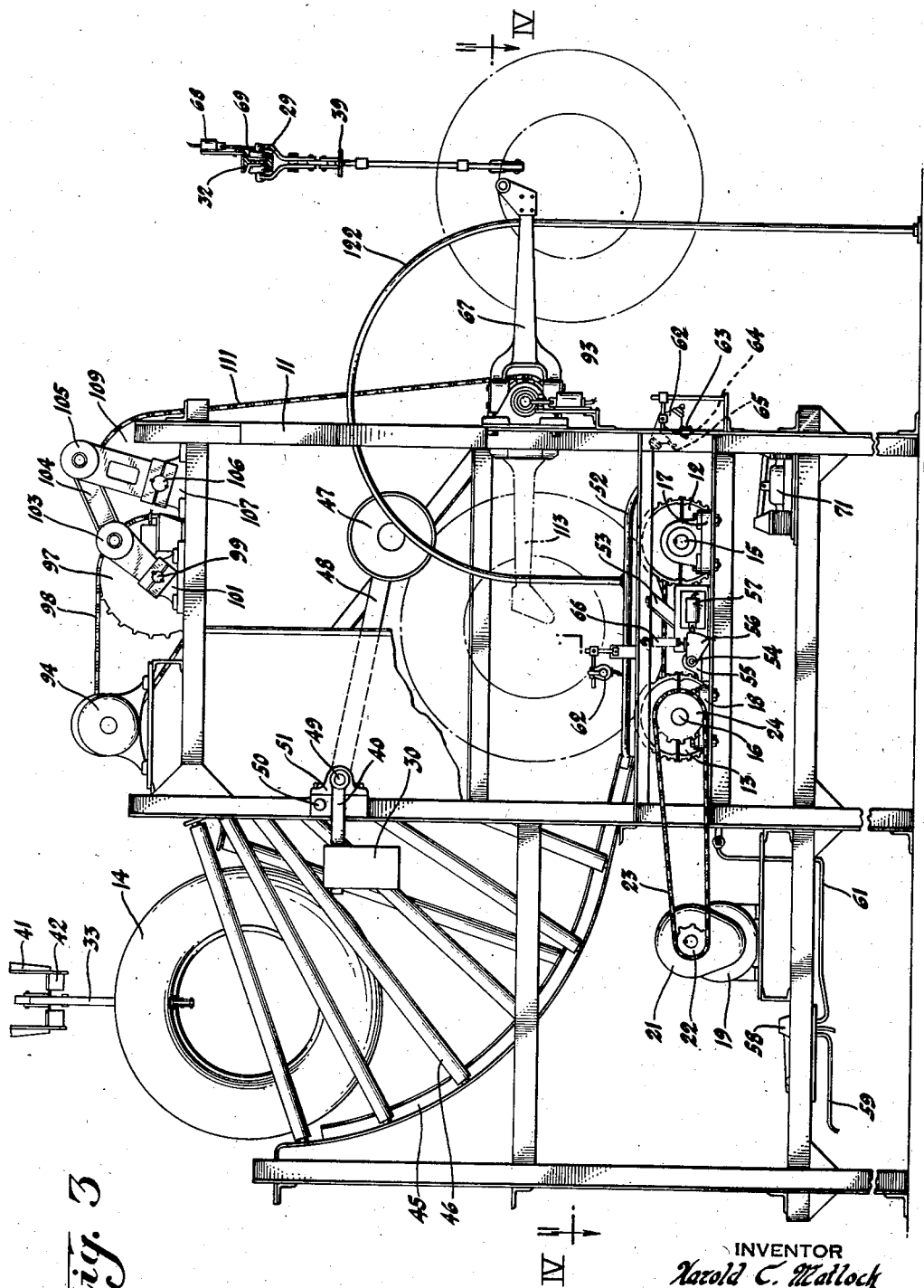
Fig. 3 is a side elevational view of the apparatus.

Referring to the drawings I show an embodiment of my invention in the form of an apparatus for treating tires, such as painting the tires, in combination with automatic conveying means for moving tires to and from the treating station. In Figs. 1, 2 and 3, I show in particular a tire treating station including a structural frame 11 suitably adapted to support tire rotating rolls 12 and 13. The rolls 12 and 13 are provided with concave corrugated tire engaging surfaces to facilitate rotation of a tire 14 and are centrally and rigidly secured to shafts 15 and 16, respectively. Each shaft 15 and 16 is supported and is free to rotate in bearings 17 and 18 mounted on the frame 11. Means for driving the pulleys 15 and 16 is provided in the form of a motor 19 and gear reduction unit 21 positioned on the frame 11. A sprocket 22 on the gear reduction unit 21 engages a chain 23 which drives a sprocket 24 secured to one end of the shaft 16. Secured to the opposite end of the shaft 16 is another sprocket 25 (Fig. 4) engaging a chain 26 which drives a sprocket 27 mounted on the shaft 15; thus the rolls 12 and 13 are continuously driven throughout the operation of the machine.

In Fig. 3, I show the tire 14 supported on a conveyor at a position from which it is about to be transferred to the treating station. The conveyor is of conventional type, comprising a driven chain 28, (Fig. 10) attached to which, at spaced intervals, are bifurcated members 29. Mounted in the members 29 are rollers 31 which travel along the path of an overhead supported track member 32. Securely attached to the lower end of the member 29 is an angular-shaped bracket 33 extending downwardly. The bracket 33 has pivoted at its lower end a tire supporting hook 34 which is held in operative position by means of a vertical bar 35 engaging an extended portion 36 of the pivot arm forming part of the hook 34. The vertical bar 35 is free to slide within retaining clips 37 and 38 forming part of the brackets 33, and is limited in upward movement by the top end of the bar engaging a swinging bracket 39 which is pivoted to the bracket 33.

Means are provided along the path of movement of the conveyor for releasing the tires from the hook 34. Suitably located and straddling the track member 32 is a forked bracket 41. Each of the downwardly extending legs of the bracket 41 have sloped projecting surfaces 42 forming part thereof. The projecting surfaces 42 are positioned to form an obstruction in the path of movement of the swinging bracket 39 causing the bracket to swing backward to the position indicated at 43. Due to the weight of the tire the vertical bar 35 is now free to slide upwardly, which movement causes the tire supporting hook 34 to tilt downward to the position indicated at 44 thus depositing the tire 14 into a receptive channel forming part of the machine. Subsequent tires carried on the conveyor are likewise deposited in the machine in a continual operation.

The tire 14 is dropped from the conveyor hook 34 onto an arcuate chute 45 (Fig. 3) forming part of the structural frame 11. A plurality of rollers 46 mounted on the arcuate chute 45 facilitate movement of the tire, which rolls by gravity onto the rotating rolls 12 and 13. To prevent the tire from rolling too far forward, and to retain the tire upright on the rolls 12 and 13 a sheave-shaped stop member 47 is mounted on an arm 48 secured to a shaft 49 which pivots in bearings 51 positioned on the structural frame 11. The counter weight 30 mounted on the arm 40 secured to one end of the shaft 49 partially counterbalances the sheave-shaped member 47. A stop pin 50 positioned to engage the arm 40 limits the downward movement of the arm 48. Guide rails 52 on either side of the tire assist in maintaining the tire in vertical position.

The tire is now located in the treating station where it may be washed, painted or subjected to some other manufacturing operation. In the present example the tire is painted by a spraying operation. The tire rotating rolls 12 and 13 as previously described are driven continuously and as the tire engages the rolls, it is caused to rotate. Simultaneously with the action of the tire rolling into place between the rolls 12 and 13, a spray of paint is caused to be discharged upon the exterior of the tire. This is accomplished by means of a trip lever 53 (Figs. 3 and 4) secured to a shaft 54 mounted in bearings 55 located below the tire on the structural frame 11. As the tire contacts the trip lever 53 it causes a partial rotation of the shaft 54 and a cam 56 secured to the end of the shaft is brought into engagement with an electric switch 57 closing a circuit leading to the solenoid operated valve 58. The valve 58 functions to permit air pressure from a supply line 59 to enter the line 61 thus starting the spray guns 62 in operation. The paint spray guns 62 are of the conventional type and for the purpose of illustration I have shown three such units positioned one on each side of the tire to spray the sidewall portions, and one directly in front of the tire to spray the tread surface. It is to be understood that additional spray units may be used. To each of the spray guns 62 lead three connections 63, 64 and 65. The connection 65 carries paint to the gun from a source of supply (not shown) and the connection 64 provides atomizer air, while the connection 63 connected to the line 61 provides air pressure necessary to operate the cylinder within the gun. This is conventional practice. The duration of the paint spray is controlled by the length of time the tire 14 is permitted to remain on the rolls 12 and 13. Immediately after the tire is removed from the rolls, a tension spring 66 functions to return the cam 56 out of engagement with the switch 57 reversing the action of the solenoid valve 58, thus stopping the spray.

The tire is removed from the spraying position by means of an arm 67 which swings into engagement with the tire, lifting it from the rollers 12 and 13 and the arm swings back to deposit the paint sprayed tire upon the supporting hook 34 suspended from the conveyor which is a continuation of that carrying the tires to the paint machine. The mechanism for removing the tire from the machine is set in motion by the action of an electric switch 68 (Fig. 2) suitably positioned on the track member 32. A trip lever 69 mounted on the track member 32 located for engagement with one of the rollers 31, at a predetermined point in the conveyor path, is caused to contact the switch 68, closing the circuit leading to the solenoid valve 71 (Fig. 5) secured to the structural frame 11. The action of the valve 71 permits fluid pressure from a supply line 72 to enter the conduit 73 leading to an air cylinder 74 attached to a sleeve 75. The sleeve 75 is supported in bearings 76 and 77 and is free to oscillate therein. Rigidly secured to one end of the sleeve 75 is a pivot block 78 which has lateral slots 79 cut in both the top and bottom sides, the slots likewise extending through the wall portions of the sleeve 75. The pivot block 78 is adapted to receive the forked end of the arm 67 and is connected therewith by means of a pin 81 (Fig. 6) which permits an oscillatory movement of the arm 67. The piston rod 82 (Fig. 5) of the cylinder 74 extends through the opening in the sleeve 75 and is connected to the arm 67 by a cross-spindle 83. Rotatably mounted on both ends of the cross-spindle 83 are rollers 84 which enter elongated holes 85 (Fig. 6) located in both sides of the forked portion of the arm 67. Cover plates 86 are provided to retain the rollers 84 in place.

An extension rod 87 (Fig. 5) passes through a central aperture in the cross-spindle 83 and is in threaded engagement with the piston rod 82. The opposite end of the extension rod 87 extends beyond the end of the sleeve 75 and a portion of the extension is threaded for engagement with a nut 88 which acts to tighten a clamping sleeve 89 against the cross-spindle 83, holding it rigidly against the end of the piston rod 82. Positioned on the extreme end of the extension rod 87 is a trip lever 91 (Fig. 2) which operates a drive mechanism, hereinafter described. A bracket 92 positioned on the frame 11 functions as a guide for the trip lever 91.

The action of the solenoid valve 71 (Fig. 5) causes the piston 82 to move forward. The cross-spindle 83 likewise travels forward in the slots 79, and being connected to the arm 67, functions to swing the arm about the pin 81, causing it to assume a position as shown by the dot and dash line at 80, (Fig. 4). As the extension rod 87 (Figs. 5 and 2) is pushed forward the trip lever 91 engages an electric switch 93 mounted on the bracket 92 which starts a driving mechanism in operation.

Means in the form of a driving mechanism is provided for swinging the arm 67 and moving the tire from the treating station to a position in alignment with a conveyor. The driving mechanism is located on the upper structure of the frame 11 and includes a motor 94 (Fig. 1) and a gear reduction unit 95. Associated therewith is a sprocket 96 which drives sprocket 97 by means of a chain 98. The sprocket 97 is mounted on the end of a shaft 99 supported in bearings 101 and 102 positioned on the frame 11. Secured to the opposite end of the shaft 99 is a crank 103 to which is attached a connecting rod 104 engaging a corresponding crank 105 fastened to the end of a shaft 106. In this manner rotary movement of the crank 103 imparts an oscillatory movement to the crank 105.

The shaft 106 is supported in bearings 107 and 108 positioned on the frame 11. Mounted on the opposite end of the shaft 106 is a sprocket 109 which is connected by means of a chain 111 to a sprocket 112 secured to the sleeve 75 (Fig. 5).

The sprocket 112 is adapted to permit a pivotal movement of the sleeve 75 to the extent of approximately 180°. As the sleeve 75 is caused to pivot, the arm 67 attached thereto swings into a position as shown by the dot and dash line at 113 (Fig. 3). At this point a cam member 114 (Fig. 1) secured to the shaft 99 engages an electric switch 115 positioned on the frame 11 which reverses the action of the solenoid valve 71 resulting in the arm 67 swinging on the pin 81 and moving in an axial direction to engage the rotating tire 14. Strictly speaking, the end of the arm 67 moves on an arc whose center is the pin 81, but since this arc is tangent to a line parallel to the axis of the tire at approximately the point where the bracket or rod on the end of the arm 67 moves inside the ring of the tire, for all practical purposes the bracket on the end of the arm may be said to move substantially parallel to the axis, that it moves generally in an axial direction into the tire. The arm 67 immediately starts its return movement and as the tire is lifted from engagement with the rolls 12 and 13, the sheave-shaped member 47 functions to stop the tire from rotating.

The action of lifting the tire is quite rapid and to prevent the arm 48 from being thrown back with too much force a conventional braking device is associated with the shaft 49. This device comprises a brake drum 118 (Fig. 8) and brake band 119. A spring 121 positioned on the frame 11 provides the necessary tension to the brake band 119. As the tire is carried forward, guide rails 122 prevent the tire from swinging on the arm 67 which places the tire directly in the path of the tire supporting hook 34 of the conveyor. A second cam member 123 (Fig. 1) secured to the shaft 99 engages an electric switch 124 positioned on the frame 11 which stops the motor 94 momentarily, permitting the tire supporting hook 34 to enter the inner circumference of the tire. The electric switch 68 is again operated by the action of the roller 31 causing the arm 67 to swing outwardly depositing the tire upon the hook 34 and continuing through a similar cycle of operation for each succeeding tire.

As thus shown and described, it is believed apparent that I have provided a novel and efficient means for treating tires in a continuous and progressive manner by which tires are positioned and removed from the treating station uniformly and automatically.

While I have shown one form of the invention it is to be understood that it is subject to obvious modifications which appear within the spirit of the invention and the scope of the appended claims.

Having thus described my invention, what I claim and desire to protect by Letters Patent is:

1. Means for treating and conveying ring-shaped articles comprising in combination a treating station, a support for suspending a treated article and for carrying it from the treating station and a transferring device for transferring said article from the treating station to the support, said transfer device including a transfer support and means actuated in response to the movement of the first-named support for moving the transfer support transversely into the ring of said article and subsequently moving parallel to the principal plane of the article to transfer the article into the path of the first-named support.

2. A transfer mechanism comprising an arm, a support shaft, a pivot block secured to the shaft, a pivotal connection between the arm and the pivot block disposed laterally of the shaft, means for moving the arm about its pivot substantially longitudinally of the shaft and means for imparting turning movement to the shaft.

3. A transfer mechanism comprising a shaft, an arm having a portion extending about the shaft, a bearing block carried by the shaft and extending laterally thereof, a pivotal connection between the block and the arm disposed laterally of the shaft, means disposed within the shaft and movable longitudinally thereof, means connecting the arm with the last named means, and means for imparting a turning movement to the shaft, whereby the arm may be turned about the axis of the shaft and moved along the axis of the shaft.

HAROLD C. MATLOCK.